United States Patent [19]

Spicar et al.

[11] 4,127,276
[45] Nov. 28, 1978

[54] GROOVE SEAL

[75] Inventors: Erich Spicar; Hans Yngvesson, both of, Ludvika, Sweden

[73] Assignee: Asea AB, Vasteras, Sweden

[21] Appl. No.: 731,797

[22] Filed: Oct. 12, 1976

[51] Int. Cl.² .............................................. F16J 15/18
[52] U.S. Cl. ................................. 277/188 R; 277/198
[58] Field of Search ................ 167/1.5; 277/81, 81 P, 277/188 R, 198

[56] References Cited

U.S. PATENT DOCUMENTS

| 3,161,350 | 12/1964 | Lorcher | 277/198 |
| 3,717,293 | 2/1973 | Traub | 277/188 R |
| 3,722,296 | 3/1973 | Tankus | 277/87 |

Primary Examiner—Robert I. Smith
Attorney, Agent, or Firm—Watson, Cole, Grindle & Watson

[57] ABSTRACT

A groove seal for effecting a seal between two bodies includes a sealing strip of elastomeric material disposed in a groove located in one of the bodies and being in contact with a side and a bottom wall of the groove. A pressure-compensating support strip and a plurality of permanent-elastic resilient elements are disposed in the groove, the elements serving to resiliently urge the sealing strip against the one side wall of the groove.

1 Claim, 6 Drawing Figures

GROOVE SEAL

BACKGROUND OF THE INVENTION

The present invention relates to a groove seal for sealing between two bodies, the seal being located in a groove in one of the bodies.

Known seals of the above-mentioned type with a sealing strip of rubber or similar elastomeric material have certain unavoidable drawbacks which, sooner or later, result in a leakage. Such a sealing strip of rubber swells or shrinks with time depending on the surrounding media and loses much or some of its elasticity. It will also shrink and swell much more than surrounding iron constructions at varying temperatures. The last-mentioned fact causes sealing strips, which have lost most of their elasticity and which have been working at a raised temperature for a long period of time, to start leaking when being cooled.

SUMMARY OF THE INVENTION

According to the present invention, the aforementioned drawbacks associated with elastic sealing strips have been eliminated. The sealing strip is only used as a material for sealing, and its inherent elasticity is not utilized for maintaining the necessary sealing pressure. This pressure is maintained instead by means of a plurality of permanent-elastic spring elements arranged in the groove, the spring elements being preferably in the form of bent plate springs. Between the spring elements and the sealing strip is a pressure-compensating support strip. This feature and other characteristic features of the invention will be more clearly understood from the following detailed description of the invention when taken in conjunction with the accompanying drawings.

DETAILED DESCRIPTION OF THE INVENTION

Figure 1:
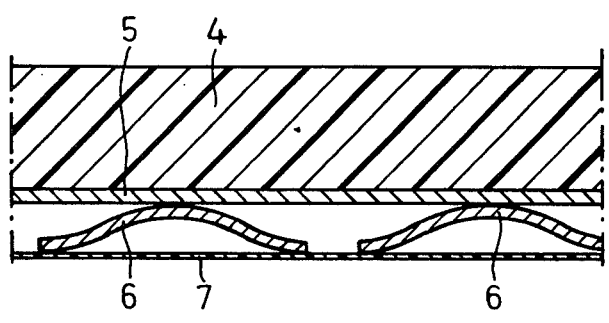
FIG. 1 is a longitudinal sectional view.
Figure 2:
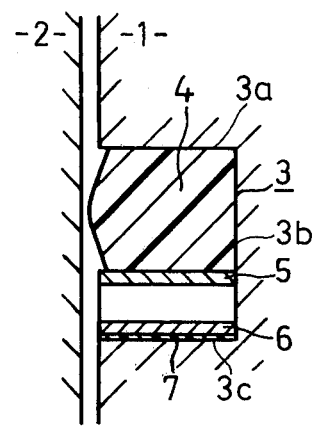
FIG. 2 is a cross-sectional view taken through a groove seal according to the invention and in an unloaded condition.
Figure 3:
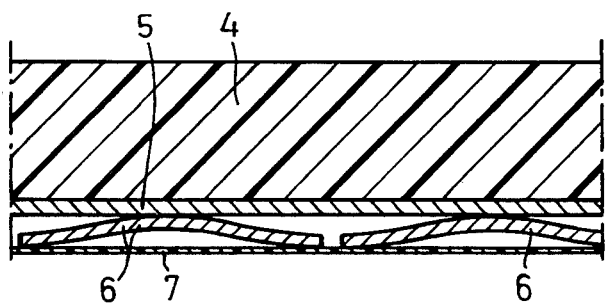
FIG. 3 is a longitudinal sectional view.
Figure 4:
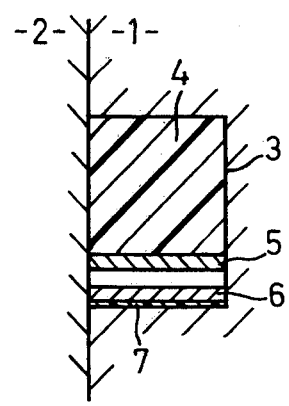
FIG. 4 is a cross-sectional view taken through the same seal in a loaded condition.

The drawings show a device intended to effect sealing between a first body 1 and a second body 2, as depicted in FIGS. 2 and 4. In practice, 1 may be a transformer tank and 2 a cover closing such tank. The seal is arranged in a groove 3 in the first body. The sealing element comprises a sealing strip 4 of an elastomeric material, such as rubber. FIGS. 2 and 4 show that the sealing strip is located in the groove in such a way that it makes contact with a side wall 3a of the groove, with a bottom wall 3b of the groove, as well as with a pressure-compensating support strip 5 which may comprise a steel plate. The support strip is held pressed against the sealing strip by means of a plurality of resilient elements 6 in the form of permanent-elastic, bent plate springs of steel, as clearly shown in FIGS. 1 and 3. To facilitate mounting, springs 6 may be glued to a supporting strip 7 of a wear-resistant plastic material, for example nylon. The strip 7 is arranged so that it bears against side wall 3c of the groove.

The volume and cross-section of the sealing strip and the pre-stressing of the resilient elements are chosen so that, when the groove seal is under no load from the cover 2, as shown in FIG. 2, the sealing strip is compressed in a direction perpendicular to strip 5 so as to effect an outward bulge of the strip from the space defined by walls 3a, 3b and the support strip 5. When the cover 2 is pressed against the tank 1, as shown in FIG. 4, the sealing strip 4 is compressed in a direction parallel to strip 5 so as to thereby press the support strip toward wall 3c against the spring action of the resilient elements 6. Such elements will therefore constantly maintain a predetermined pressure on the sealing strip, even if its elasticity is diminished to a major or minor degree because of aging or other factors.

Figure 5:
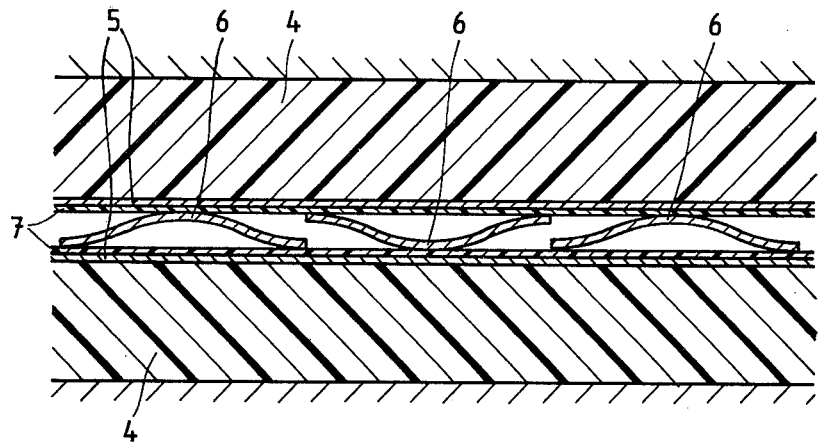
FIGS. 5 and 6 are longitudinal sectional views of two other embodiments of a groove seal having two sealing strips.
Figure 6:
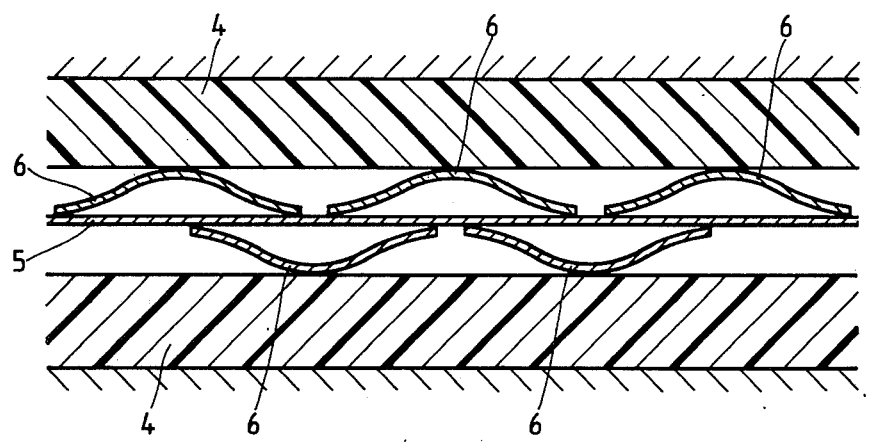

The seal shown in FIGS. 1 to 4 is preferably designed for straight grooves. If the groove is curved, as for example in a corner of a box, certain problems may arise because when the support strip 5 moves perpendicular to the groove, for example due to thermal changes, the movement will be in different directions on the two sides of a corner so as to therefore cause a lack or excess of support strip material to occur at the corner. This drawback can be substantially avoided by placing the support strip as close to the longitudinal centerline of the seal as possible and by longitudinally dividing the sealing strip into two parallel parts. These parts are then placed one at each groove side, as shown in FIGS. 5 and 6. In the groove seal shown in FIG. 5 there are thus used two parallel parts 4 of the sealing strip and also two parallel support strips 5. The resilient elements 6 are located between the two support strips, thus holding the sealing strips pressed against the groove sides.

If the sealing strips are of relatively rigid material, the groove seal may be constructed according to FIG. 6 with two sealing strips, one at either groove edge as in FIG. 5, and a single support strip 5, which will then be located at the longitudinal centerline of the seal. The resilient elements 6 are disposed on opposite sides of the support strip, preferably symmetrically on both sides. In the same manner as shown in FIGS. 1 to 4, it may be advantageous also in the embodiments according to FIGS. 5 and 6 to place a strip such as 7 of a durable plastic material between the resilient elements and each support strip of FIG. 5, and between the resilient elements and each side of the FIG. 6 support strip.

The principal advantage of the groove seal according to the invention is that its sealing property is not dependent upon the elasticity of the sealing strip 4, but is primarily dependent upon the resilient elements 6 which may be made of a material which maintains its properties for a substantially unlimited period of time. The groove seal according to the invention will therefore acquire a very long life in comparison with known seals. The sealing material, for example rubber, is completely enclosed in metal and is thus well protected against oxidation and the attack of solvents, sunlight and ozone.

Obviously, many modifications and variations of the invention are made possible in the light of the above teachings. It is therefore to be understood that within the scope of the appended claims the invention may be practiced otherwise than as specifically described.

What is claimed is:

1. A groove seal for effecting a tight seal between a first and a second body, said first body having an open groove therein defined by a bottom and first and second side walls, first and second sealing strips of elastomeric material disposed in the groove, said first sealing strip contacting the first wall and the bottom, said second sealing strip contacting the second wall and the bottom, a support strip lying between and being spaced from said sealing strips, resilient elements arranged between the sealing strips on opposite sides of the support strip, each of the sealing strips having a predetermined cross-sectional size, said resilient elements being prestressed to a predetermined value whereby the sealing strips are bulged outwardly of the open side of the groove by the resilient elements so that, when the second body is pressed against the first body over the groove, the sealing strips are compressed by the second body inwardly of the groove against the action of the resilient elements to thereby effect a tight seal between the two bodies and the resilient elements constantly maintaining a predetermined pressure against the sealing strips even if the elasticity thereof diminishes during extended use.

* * * * *